June 11, 1963 A. C. SCURLOCK ET AL 3,092,959
PROCESS FOR GENERATING GASES AND APPARATUS THEREFOR
Filed Nov. 6, 1957 6 Sheets-Sheet 2

INVENTORS
ARCH C. SCURLOCK,
KEITH E. RUMBEL AND
RAYMOND FRIEDMAN
BY Martha L. Ross
AGENT INVENTORS
ARCH C. SCURLOCK,
KEITH E. RUMBEL AND
RAYMOND FRIEDMAN
BY Martha L. Ross
AGENT

INVENTORS
ARCH C. SCURLOCK,
KEITH E. RUMBEL AND
RAYMOND FRIEDMAN
BY Martha L. Ross
AGENT June 11, 1963  A. C. SCURLOCK ETAL  3,092,959
PROCESS FOR GENERATING GASES AND APPARATUS THEREFOR
Filed Nov. 6, 1957  6 Sheets-Sheet 6

INVENTORS
ARCH C. SCURLOCK,
KEITH E. RUMBEL AND
RAYMOND FRIEDMAN
BY Martha S. Ross
AGENT

United States Patent Office 3,092,959
Patented June 11, 1963

3,092,959
PROCESS FOR GENERATING GASES AND
APPARATUS THEREFOR
Arch C. Scurlock, Alexandria, Keith E. Rumbel, Falls Church, and Raymond Friedman, Alexandria, Va., assignors to Atlantic Research Corporation, Alexandria, Va., a corporation of Virginia
Filed Nov. 6, 1957, Ser. No. 694,894
17 Claims. (Cl. 60—35.4)

This invention relates to a new process for generating gases by combustion of a plastic, extrudable monopropellant for such purposes as producing thrust, power, heat energy or gas pressure and apparatus therefor.

The term monopropellant refers to a composition which is substantially self-sufficient with regard to its oxidant requirements as distinguished from bipropellants where the fuel is maintained separately from the oxidizer source until admixture at the point of combustion.

Generation of gases for producing thrust, as in a jet motor, or as a prime mover, as in a gas turbine, has hitherto generally been accomplished either by burning atomized sprays of mobile liquid mono- or bipropellant injected from a storage tank or tanks into the combustion chamber or by combustion of a solid propellant grain housed in the combustion chamber. Although each of these methods possesses desirable advantages relative to the other, each is also characterized by undesirable features.

The use of mobile liquid monopropellants, namely propellants which are injectable into a combustion chamber in the form of finely divided droplets or sprays, has the following important advantages. The mass burning rate and, thereby, the volume of combustion gases produced are controllable by varying the rate of injection. Combustion can be stopped by shutting off flow and resumed at will. Performance is not dependent upon the temperature environment of the system. Duration of operation is limited only by capacity of the storage tanks or reservoirs. Liquid monopropellants, furthermore, possess an important advantage over liquid bipropellants since the former require only one storage tank, one propellant pump, and one set of feed lines and valves, and eliminate elaborate systems for ensuring properly proportionated flow of the separate fuel and oxidizer components and their adequate admixture in the combustion chamber.

However, the usual mobile liquid monopropellants are characterized by disadvantages such as low density, low specific impulse, high toxicity, excessive sensitivity to heat and shock resulting in detonation, and corrosiveness to various parts of the system, such as valves. When used in a rocket motor, there is some tendency for unburned droplets of the liquid propellant to leave the combustion chamber and to be cooled during expansion in the nozzle before combustion occurs. Performance may also be affected by attitude of the system.

Not only is a complex system of tubing, valves, and usually pumps required to fill the liquid propellant tanks and to move the propellant from there into the combustion chamber, but provision must be made to purge the system of propellant after test firings are made. Metal catalysis problems are sometimes encountered in passing the liquid through the complex system. Catalyst beds are required for combustion of some liquid monopropellants and vibration of the system often poses problems of retaining the bed firmly fixed in the combustion chamber. Storage and transportation of liquid propellants is also a problem because of their tendency to leak readily. Such leakage presents both a fire and toxicity hazard.

Solid propellants, as a means for generating gases, possess the advantages of high density, low heat and shock sensitivity, good stability, long storageability, absence of leakage, low corrosiveness and toxicity and elimination of propellant filling and injection equipment and controls since all of the solid propellant is contained directly in the combustion chamber. Solid propellants do not require purging of the system after test firing, do not need an external combustion catalyst and are not affected by the attitude of the system.

Such gas generating, solid propellant systems do, however, possess a number of disadvantages. The solid grain must be sufficiently strong and free from mechanical flaws so that it does not crack or shatter under pressure or vibrational stresses. Many solid propellants also tend to become excessively brittle at low ambient temperatures and thereby subject to fracture. Cracking or shattering of the propellant grain in the combustion chamber may cause such a large, uncontrolled increase in burning surface that the walls of the combustion chamber cannot withstand the pressure. Although a burning solid propellant grain can be quenched, if necessary, by suitable means, reignition is not feasible, so that the unburned portion is a total loss and intermittency of operation is impractical. Ambient temperature of the propellant grain is an important parameter in determining burning rate and cannot be compensated for during use by variation of the area of burning surface.

Solid propellant grains must be predesigned and preshaped with respect to burning suface area for each particular application, since such area is set for a given grain and cannot subsequently be varied. This makes necessary the production and storage of a large variety of grains of different design. Such predesigned solid propellant grains cannot accommodate during burning to variations in operational requirements or to different ambient temperatures. The only way in which a solid propellant gas-generating composition can be designed to meet unforseen operational requirements is to produce an adequate supply of gases at the extremes of high usage requirements and low ambient temperature, which in most cases necessitates venting and wasting surplus gas at other operating conditions. Wastage in this manner can be as high as 80% of the gas produced and provides a design problem in terms of a modulating valve which can withstand the high temperature exhaust gases. Size of the grains must also be predetermined and permits no subsequent variation in amount consumed unless waste of an unburned portion of the grain poses no economic or other problem. Maximum duration of burning time or thrust is considerably shorter than that which can be provided by a liquid propellant which is limited largely by storage capacity of the reservoir.

The combustion chamber must be of sufficient size to accommodate all of the propellant and, therefore, is generally larger than required for combustion of a liquid propellant. Since the walls of the entire combustion chamber must be strong enough to withstand the high combustion gas pressures and completely insulated or otherwise cooled to withstand the high combustion gas temperatures, this may pose a more serious weight problem than that of a propellant storage tank. The geometry of the combustion chamber is, furthermore, immobilized by the design requirements of the propellant grain and cannot, in many cases, be adapted to the particular structural needs of the device as a whole.

The general object of this invention is to provide a new method for generating gases employing a plastic monopropellant which combines most of the advantages of methods employing either mobile liquid propellants or solid propellants and which eliminates most of their disadvantages.

Another object is to provide a new method for generating gases which makes possible controlled feeding of a monopropellant into a combustion chamber, a controllable burning surface not dependent upon subdivision or atomization in the combustion chamber, reduced combustion chamber size, quenching and reignition and tolerance of system attitude, and which, furthermore, makes possible the use, in the foregoing manner, of compositions characterized by high density, high impulse, high autoignition temperature, non-leakage and substantial freedom from shock sensitivity, corrosiveness and toxicity.

Still another object is to provide a new method for generating gases which makes possible the use, in the aforedescribed manner, of monopropellant compositions which can be safely prepared, handled and stored.

Another object is to provide a new method for generating gases having high available energy for developing thrust or power as, for example, for use in jet or rocket reaction motors, gas turbines, reciprocating engines and the like or for providing heat or gas pressure.

A further object of the invention is the provision of apparatus for implementing the method in the fulfillment of the foregoing objects, and other objects which will appear as the following description proceeds.

We have discovered a new and highly advantageous method for generating gases which comprises extruding a plastic monopropellant composition, having sufficient cohesive strength to retain a formed shape and capable of continuous flow at ordinary to reduced temperatures under pressure, from a storage chamber into a combustion chamber in the form of any desired coherent shape, such as a column, strip, or the like and burning the leading face of the continuously advancing material in the combustion chamber. The leading face of the shape-retaining mass thus presents a burning surface of predeterminable area which can be varied and controlled by varying the rate of extrusion, and/or varying the size and shape of the cross-sectional area of the feeding or extrusion orifices or tubes and/or by shaping or recessing the leading face of the advancing mass to increase the available burning surface by suitable means. The extent of overall burning surface area can also be regulated by providing a plurality of feeding orifices or tubes which can be varied in number. Thus, mass burning rate of the monopropellant and the amount and pressure of combustion gases generated can easily be regulated by controlled feeding.

In this way, the rate of gas generation can be tailored to particular requirements both before and during operation within limits set by the particular properties of the monopropellant compositions and the structural limitations of the rocket, gas generator or other device. Similarly, factors affecting burning rate of the propellant material, such as its ambient temperature or pressure conditions in the combustion chamber, can be compensated for by controlling feeding rate or adjustment of the size or shape of the mass of extruded propellant.

Because of the fluidity of the material under stress at ambient temperatures, the monopropellant can be fed into the combustion chamber at a rate adjusted to the desired mass burning rate of the composition so that at equilibrium or steady-state burning, namely when the mass burning rate does not vary with time, the burning surface of the continuously extruding propellant remains substantially stationary relative to the walls of the combustion chamber. Since burning is confined to a well-defined burning surface area, much as in the case of the burning of solid propellant grains, combustion chamber length requirements are generally quite small, both as compared with that needed for complete reaction of sprayed or atomized conventional mobile liquid propellants and for housing of conventional solid propellant grains. This makes possible a substantial saving in dead weight, since the combustion chamber not only must be built to withstand the high combustion gas pressures, but must also be heavily insulated and made of materials, generally heavy, such as alloy steels or nickel alloys, such as Inconel, which are resistant to the corrosive gases. Unlike solid propellant combustion chambers, which must conform to design requirements of the propellant grain, the combustion chamber employed in our process can be designed to meet the shape or other requirements of the particular gas generator device.

Duration of combustion is limited only by the capacity of the monopropellant storage container and appropriate means for cooling the walls of the combustion chamber, where necessary, and can be continuous or intermittent. Combustion can be quenched at any time by any suitable means, such as a cut-off device which shuts off further propellant extrusion into the combustion space and can be placed in any appropriate position relative to the extrusion orifice, and can be reinitiated by opening the shut-off mechanism and reigniting the leading face of the extruding propellant. In some applications, intermittency of operation is not necessary and a cut-off mechanism can be dispensed with, although it may be desirable in such a situation to seal off the propellant in the storage chamber from the combustion chamber by means which can be opened or ruptured when operation begins.

Another advantage of our invention stems from the substantial non-fluidity of the monopropellants except under stress since, unlike mobile liquids it makes the system substantially immune to attitude. This makes unnecessary elaborate precautions to maintain the stored propellant during operation in constant communication with a pumping means or the feeding orifice into the combustion chamber.

Controllable feeding of the monopropellant eliminates the wastage encountered with solid propellants by permitting regulation both before and during operation to meet environmental factors and varying operational needs and the necessity for manufacturing and storing a large variety of solid propellant grains predesigned with regard to burning surface area characteristics and size.

Like conventional mobile liquid monopropellants, as distinguished from liquid bipropellants, the system requires only one storage container or reservoir and one set of pressuring means, feeding tubes and control valves, thereby simplifying the complexity of the device and reducing weight. There is also no need for combustion catalysts in the combustion chamber.

In operation, the plastic monopropellant is extruded from the storage chamber through a shaping means such as a tube or orifice of any suitable size, shape and number, into the combustion chamber by means of any suitable pressurizing device, such as a piston or bladder actuated by a pressurized fluid or a properly designed pump, which can exert a sufficiently high positive pressure on the monopropellant relative to that in the combustion chamber to keep the propellant flowing into the combustion chamber at a linear rate at least equal to the linear burning rate of the propellant composition and at such higher rates as might be required to obtain desired variation in mass burning rate and gas production. The shaping means, such as a tube or orifice, which can be further provided with means for shaping or recessing the leading end of the material to increase available burning surface area, functions substantially as a die forming the extruding material into a cohesive, shape-retaining advancing mass, such as a column or strip, of predetermined shape and of predetermined cross-sectional area, which can be varied by providing means for reducing or increasing the cross-sectional area of the orifice either before or during operation.

The leading face of the extruding column or strip of propellant can be ignited in the combustion chamber by any suitable means, such as an electrical squib, high resistance wire, electric arc or spark gap. The burning leading face thereby provides a constantly generating burning surface, predetermined in size and geometry by the size and shape of the extrusion shaping means, such as a tube or orifice, by any shaping or recessing means associated with the tube or orifice, and by the rate of extrusion, as the end-burning material advances. As aforementioned, the minimum rate of extrusion of the monopropellant must be at least equal to the linear burning rate of the composition and preferably higher to prevent burning back into the propellant storage chamber.

Figure 1:
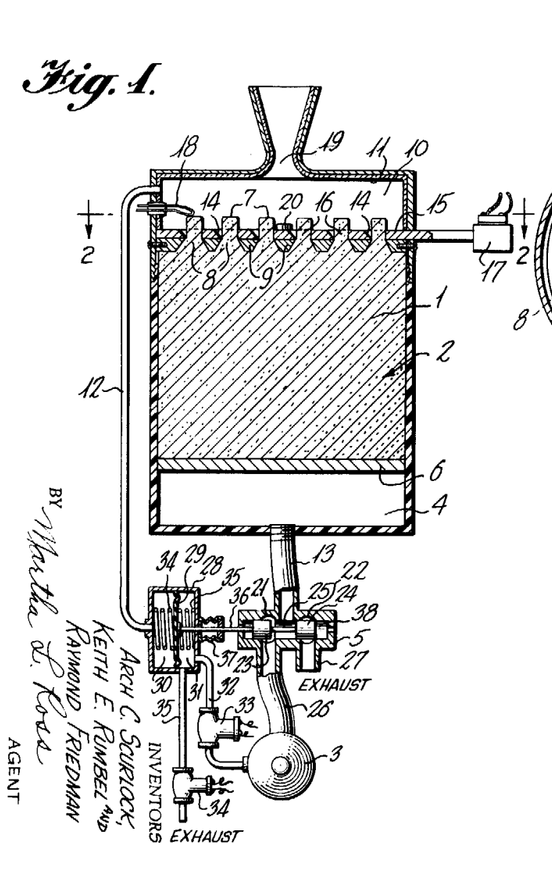
FIGURE 1 is a longitudinal cross-sectional view through a diagrammatic embodiment of the invention.
Figures 8, 10:
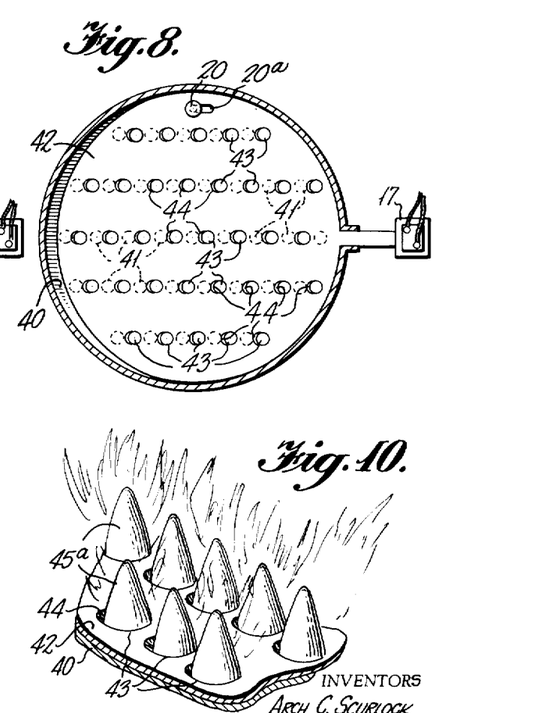
FIGURE 8 shows the device of FIGURE 7 in closed position.
FIGURES 9 and 10 are fragmentary perspective views showing the equilibrium cone-shaped burning surface formed by a column of extruding monopropellant in the combustion chamber at different rates of extrusion.
Figure 9:
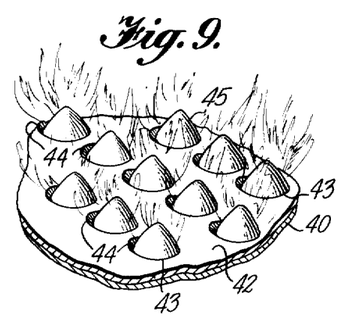
Figure 20:
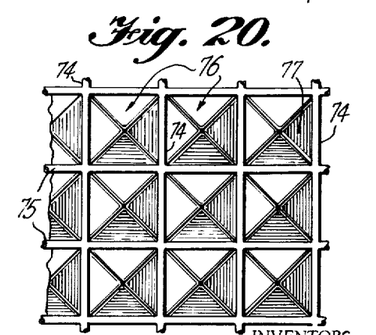
FIGURE 20 is a fragmentary plan view of another grid-type shaping means.

Prior to ignition, the leading face of the extruding propellant mass will generally approximate a plane surface, as shown in FIGURE 1. After ignition, if extrusion rate is about equal to linear burning rate of the composition, burning of the extruding material takes place substantially at the point of entry into the combustion chamber, for example, at the orifice, and the burning surface, which is, in effect, the leading face of the propellant material, retains the form of a transverse plane. At the preferred higher rates of extrusion, a longer column or strip projects into the combustion chamber and, under the influence of the circulating high-temperature combustion gases, burning extends upstream along the exposed surface of the extruding mass within the combustion chamber. When burning equilibrium is reached at a given rate of extrusion which is higher than linear burning rate, the surface of the propellant material protruding into the combustion chamber converges in the downstream direction, forming a downstream edge when the material is extruded as a strip or ribbon, as illustrated in FIGURES 5, 6, 14, 15, 16, and 21, or a downstream apex when the material is extruded through a circular orifice as illustrated in FIGURES 9 and 10, or a rectangular orifice as shown in FIGURE 20, thereby providing a convergent leading face or end and a burning surface of desired extensive area.

Figure 6:
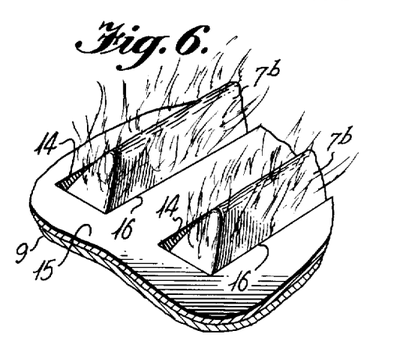
Figures 11, 12, 13, 14, 15:
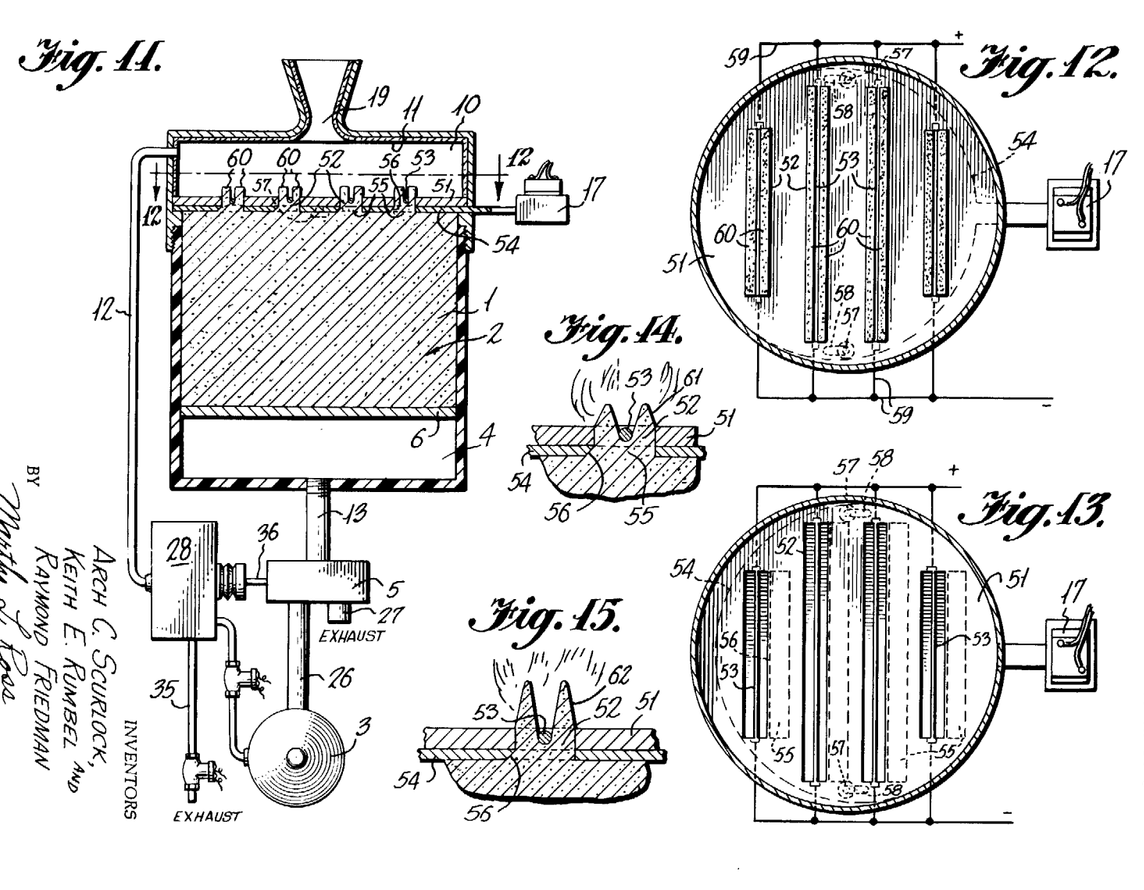
FIGURE 11 is vertical sectional view of a modified form of the device.
FIGURE 12 is a horizontal sectional view taken along the line 12—12 of FIGURE 11.
FIGURE 13 is a view similar to FIGURE 12 but showing the device in closed position.
FIGURES 14 and 15 are fragmentary sectional views of the equilibrium burning surface of the extruding monopropellant at different rates of extrusion.

The burning surface area of such sloping configurations is determined by the angle subtended by the converging sides, which is determined by the length of the propellant strip or column protruding into the combustion chamber from the downstream edge or apex to the orifice, which, in turn, is determined largely by the rate of extrusion. The higher the rate of extrusion, the longer is the column or strip, the more acute is the angle subtended by the sloping sides, and the greater is the burning surface, as shown in FIGURES 6, 10 and 15. Thus the burning surface area, which, in turn, determines the mass burning rate and the mass rate of gas generation, can be controlled by varying the rate of extrusion of the monopropellant. It will be seen, therefore, that controlled feeding and, thereby, controlled rate of gas generation can be achieved by varying the rate of extrusion. This can be readily accomplished by controlling extrusion pressure on the propellant with the aid of suitable regulatory devices.

Feeding and mass burning surface area can also be varied and controlled by providing suitable shaping means as the propellant mass is extruded from the storage chamber into the combustion chamber. The propellant can be divided into a plurality of substantially separate extruding shaped masses of substantially any desired size or configuration, such as columns or strips of any desired cross-sectional shape, into a plurality of substantially separate shaped masses, some or all of which have their leading faces shaped or recessed to increase burning surface area or formed into a single advancing mass having its leading face shaped or recessed by suitable means to provide a desired increase in burning surface area.

Figure 16:
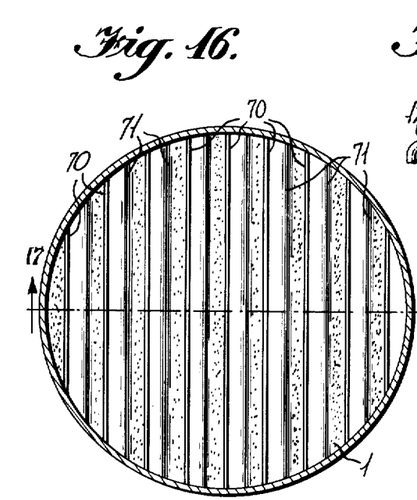
FIGURE 16 is a plan view showing another modification of the propellant shaping means.
Figures 21, 22, 23A, 24:
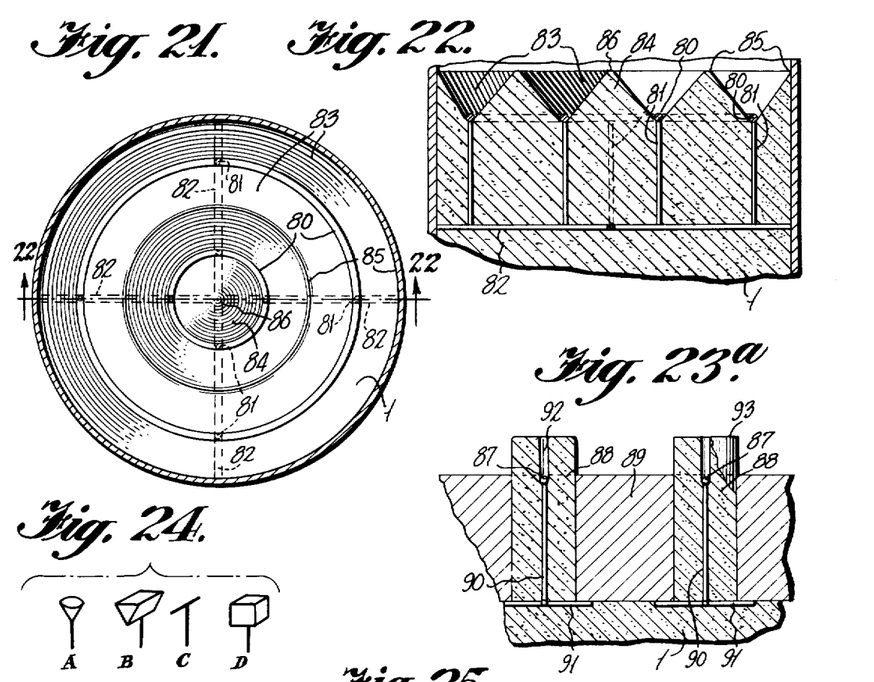
FIGURE 21 is a plan view showing concentric flow-dividers.
FIGURE 22 is a vertical sectional view taken along line 22—22 of FIGURE 21.
FIGURE 23a is a fragmentary vertical sectional view showing a mandrel-type flow-divider and extruding propellant prior to ignition.
FIGURE 24 is a schematic perspective view of 4 different mandrel-type flow-dividers.

The propellant shaping means can be any suitable device for accomplishing the desired shaping or shaping and dividing of an extruding propellant. It can, for example, be an extrusion plate of any desired and suitable strength and depth, provided with a plurality of orifices of any desired and suitable shape and size spaced at a substantial distance from each other, as illustrated in FIGURES 1, 7, 11, 23a and 27, or it can be reduced to a plurality of flow dividers of relatively small width and depth spaced and positioned relative to each other in any suitable manner and configuration for a given application, as illustrated in FIGURES 16, 20 and 21.

Figures 2, 3, 4:
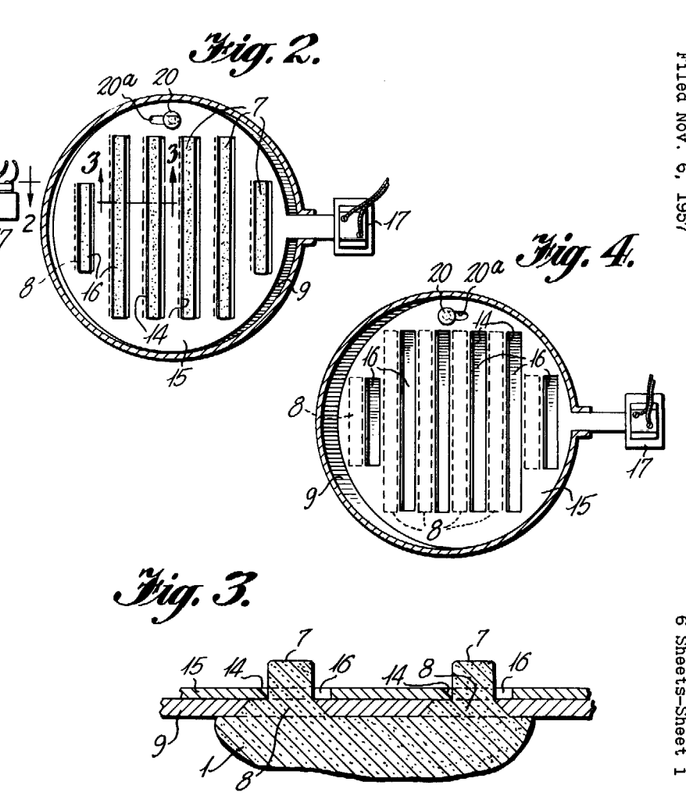
FIGURE 2 is a cross-sectional view along lines 2—2 of FIGURE 1 showing the extruder plate and mass flow control and cut-off device in partially closed position.
FIGURE 3 is a fragmentary cross-sectional view taken on line 3—3 of FIGURE 2.
FIGURE 4 is similar to FIGURE 2 but showing the device in closed position.
Figure 28:
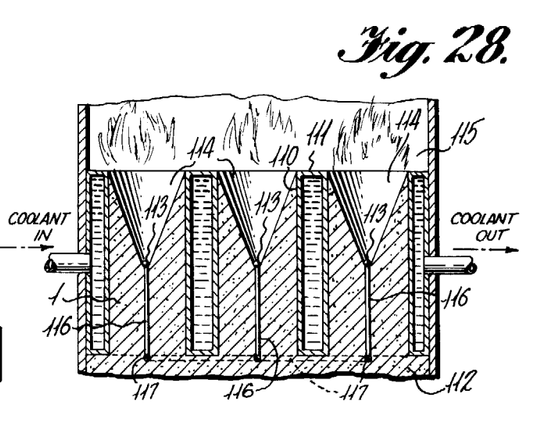
FIGURE 28 is a vertical cross-sectional view taken along line 28—28 of FIGURE 27.

An extrusion plate having orifices which are substantially spaced from each other possesses certain advantages such as making possible increased strength to withstand high extrusion pressures, variation in size of the individual orifices before or during operation, as illustrated in FIGURES 2 and 3, and internal cooling of the plate surface exposed to the hot combustion gases in the combustion chamber, as illustrated in FIGURE 28, by interior circulation of a cooling fluid.

Reducing the space between orifices to yield flow-dividers of narrow width, on the other hand, permits considerable reduction in weight and makes possible extrusion of increased amount of propellant by maximizing total cross-sectional area of the orifices as illustrated in FIG- URES 16, 20, and 21. Shortening the depth of the flow dividers reduces frictional resistance to flow and the pressure differential required to maintain extrusion at the desired rate. A flow divider of small mass can also more readily be kept cooled by flow of the mass of unburned propellant past it than can a flow separator having a relatively large surface exposed to the combustion chamber.

In some cases the advantages of orifices substantially spaced from each other and narrow flow dividers can be combined by introducing into the former a narrow divider, such as a wire, as shown in FIGURES 11, 12 and 13. The narrow flow divider can be one or several and can be positioned in the larger orifice in any desired manner or configuration.

An important advantage of flow dividers of small cross-sectional area, such as wires, lies in the fact that they can be employed as igniters, as shown diagrammatically in FIGURE 12, both initially to ignite the propellant material and to reignite it for intermittent operation.

Figure 23B:
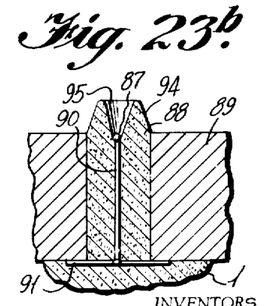
FIGURE 23b is similar to FIGURE 23a showing the equilibrium burning surface.

A given extruding mass of the plastic monopropellant, such as a column or strip of the material, can also have its leading face shaped or recessed to increase burning surface area by means of a flow divider, so associated with the extrusion tube or orifice and of such dimensions that it is completely within the peripheral boundary of flow of the extruding propellant. Such a flow divider, which will hereinafter be termed a mandrel, produces an axial recess or bore in the leading face of the monopropellant as the latter is extruded around it and thereby exposes additional propellant surface. The shape and cross-sectional area of the recess is determined by the configuration and size of the mandrel, which can be varied as desired. A spherical mandrel, for example, produces a cylindrical bore in the unignited material, as shown in FIGURE 23a. When the propellant is ignited, this interiorly exposed surface becomes part of the burning surface and, at burning equilibrium, slopes to a leading edge to form, in the case of a cylindrical bore, an inverted cone within the leading face of the extruding propellant, as shown in FIGURE 23b, thereby considerably increasing burning surface area. The cone angle and depth are determined by the rate of extrusion; the higher the rate, the more acute is the angle and the deeper the cone.

Other suggested shapes of mandrel are indicated in FIGURE 24 in which the reference characters A and D refer respectively to a cone and cube, which produce respectively a cylindrical and rectangular bore through the extrusion. The reference characters B and C refer to elongated bodies forming bores of oblong cross section, that produced by mandrel C being a narrow slot.

The mandrel can be positioned just above the extrusion orifice, just within the extrusion orifice, as illustrated in FIGURES 23a and 23b, or down inside an extrusion tube, as illustrated in FIGURE 28. In the latter case burning takes place within the extrusion tube on the interior, inverted conical surface of the extruding mass and the portion of the tube above the burning surface becomes part of the combustion chamber. Burning within a tube, which can be of any desired cross-sectional shape, has the advantage both of permitting internal cooling of the walls, as illustrated in FIGURE 28, and of supporting the periphery of the extruding mass. Such a peripheral support may be advantageous when the device is subjected to severe accelerative stresses to prevent fragmentation of the material. The mandrel in this case produces the desired large burning surface area.

Figure 25:
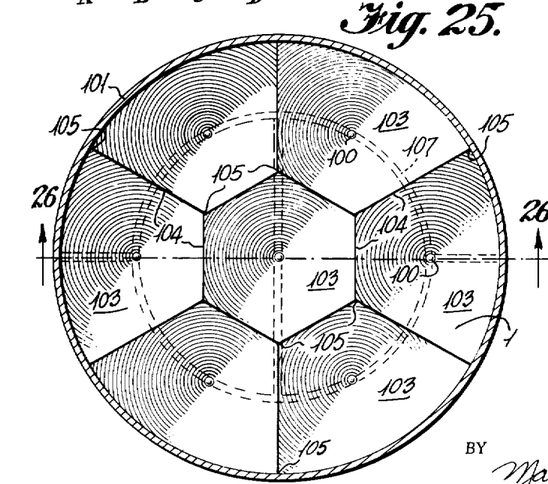
FIGURE 25 is a plan view of still another form of flow-divider shaping means.
Figure 26:
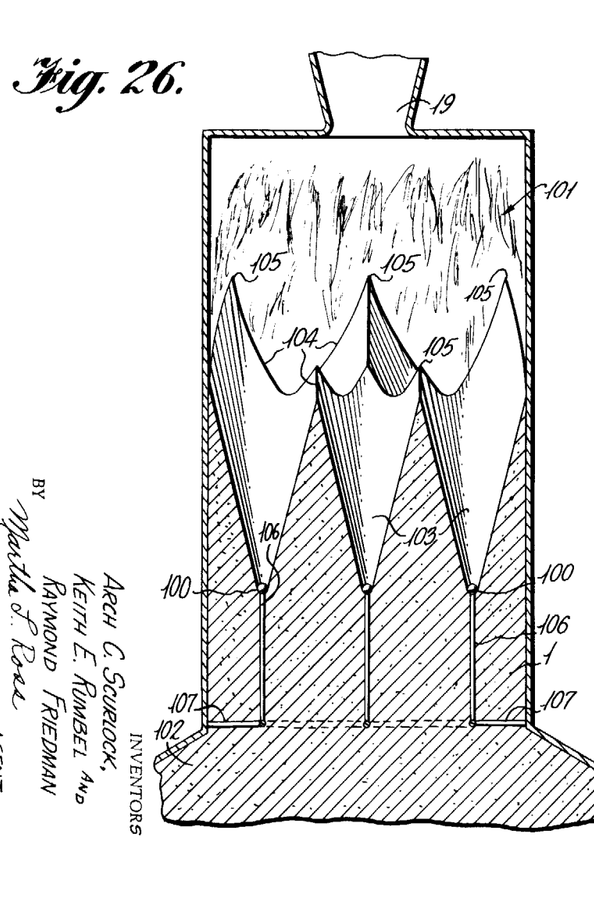
FIGURE 26 is a vertical cross-sectional view taken along line 26—26 of FIGURE 25.

The combustion chamber itself can be employed as a single extrusion tube of large cross-sectional area with the leading face of the extruding monopropellant shaped into a burning surface of large total area by means of a plurality of mandrels, each of which forms a recessed burning area, as illustrated, for example in FIGS. 25 and 26. The shape of such an extruding burning surface can be varied as desired by varying the number, size and shape of the mandrels.

Decreasing the cross-sectional area of an extrusion orifice proportionately decreases the cross-sectional area of the shaped mass of material extruding at a given linear rate of extrusion and, thereby, reduces the amount of burning surface area at equilibrium burning. Increasing the size of the orifice has the opposite effect. In the case of an orifice which is substantially longer than it is wide in its transverse dimensions relative to the axis of propellant flow, a decrease in its longer dimension, so long as length remains greater than width, does not change the height of the burning extruding propellant mass at the given linear rate of extrusion at equilibrium burning. If, however, the orifice is reduced in its smaller transverse dimension as, for example, the width of a slot orifice, height of the extruding burning mass at a given linear extrusion rate is reduced, and total burning surface area is reduced in amount proportional to the reduction in orifice area. In the case of a symmetrical orifice, such as a circular orifice, any reduction in cross-sectional area reduces height of the burning extruding mass at a given linear rate of extrusion. By height of the extruding mass is meant the linear distance from its leading edge or apex to the extruding orifice.

Thus it may require two or more narrow orifices to provide the same total burning surface area as would a single wide orifice but the narrower orifices provide the advantages, important in some applications, of permitting use of a shorter combustion chamber, or of substantially increasing the upper limit of extrusion rate. The higher the extrusion rate, the greater is the height of the extruding column or strip. Maximum practical height is determined in some applications by the cohesiveness of the propellant composition, namely the distance to which it can be extruded without sagging under the stress of its own weight, and in other cases by accelerative or vibrational stresses which might cause fragmentation of excessively long extruded masses. Similar results are obtained by decreasing the size and increasing the number of symmetrical orifices or by more closely spacing a plurality of mandrels in a mass of extruding propellant. Narrow flow-dividers as shown in FIGS. 12, 16, 20 and 21 possess the advantage of maximizing the number of narrow orifices possible as well as maximizing total cross-sectional area of the orifices.

The generated high-energy gases can be used to produce thrust as, for example, in the rocket motor of a plane, projectile, or jet-assist take-off unit, or for prime movers such as in a gas turbine, reciprocating engine, or the like. They can be employed to drive torpedoes, helicopters, fluid and jet pumps, auxiliary power supply units and the like.

FIGURE 1 shows diagrammatically a rocket motor device employing our new process for generating gases. The monopropellant 1, which is a plastic cohesive, shape-retaining composition capable of continuous flow under small to moderate pressure, is contained in storage chamber 2. Tank 3 contains a gas, such as air, under high pressure which feeds into piston chamber 4 via valve regular 5 and pipe 13 and actuates piston 6, thereby exerting pressure on the propellant, causing it to flow and extrude in the form of strips or ribbons 7 through rectangular slot orifices 8 in a suitably insulated plate 9 separating the propellant storage chamber from combustion chamber 10 provided with a suitable layer of insulation 11.

A valve regulator system maintains a positive pressure in piston chamber 4 relative to combustion chamber pressure which is sufficiently high to maintain propellant extrusion at the desired extrusion rate, which is at least as high as the linear burning rate of the propellant and preferably higher. A suitable system for this purpose is shown diagrammatically. Regulator 5 contains a cylindrical bore 38 provided with annular grooves 21 and 22 forming annular gas ports which can be completely or partially opened or completely closed by longitudinal motion of cylindrical valves 23 and 24, connected by rod 25 so that they move simultaneously. Tank 3 is connected by pipe 26 with port 21 through which it feeds pressurized gas into pipe 13 and piston chamber 4 in an amount determined by the position of valve 23. When port 21 is open, port 22 is closed. When valve 23 moves to the right sufficiently to close port 21, valve 24 also moves to open port 22 and some pressurizing gas in the piston chamber 4 vents through pipe 13, port 22 and exhaust pipe 27 opening out of port 22, thereby reducing the pressure on the monopropellant and its extrusion rate when necessary. Motion of valves 23 and 24 and, thereby, pressure in the piston chamber 4 and extrusion rate, is controlled by pressure-responsive regulator 28 which is transversely partitioned by diaphragm 29 into two chambers 30 and 31. Tube 12 communicates to chamber 30 the combustion gas pressure in the combustion chamber. Chamber 31 is maintained at a predetermined pressure level by means of tube 32 connected to pressurized gas tank 3 and a regulatory solenoid valve 33. Coil springs 34 and 35 act as restoring forces on the diaphragm to reduce reaction time lag. Motion of the diaphragm is communicated to valves 23 and 24 by connecting rod 36. Bellows 37 serves as a gas seal.

The regulatory system functions as follows. Pressure in chamber 31 is set at the desired level of combustion chamber pressure which in turn is produced by burning of the propellant at a particular, required rate of propellant extrusion. This can readily be calculated from knowledge of the burning characteristics of the particular propellant composition, the total burning surface area presented by the extruding propellant as determined by the cross-sectional area of the extruding orifices and other known factors such as the size and shape of the combustion chamber and the venturi nozzle. So long as this desired combustion chamber pressure is maintained, diaphragm 29 is in neutral position and pressurizing gas is fed through port 21 into the piston chamber in the required amounts to maintain the requisite rate of extrusion. If combustion chamber pressure drops, the diaphragm is pushed to the left, valve 23 moves to the left, more pressurizing gas is fed into the piston chamber, extrusion rate increases, mass burning rate increases, and combustion chamber pressure is increased to the desired level. If combustion chamber pressure rises beyond the desired level, the diaphragm moves to the right, port 21 closes, exhaust port 22 opens and sufficient gases vent from the piston chamber to reduce extrusion rate to the requisite degree.

The system can be further controlled to regulate and vary the rate of extrusion to meet variations in operating requirements during the burning cycle by means of solenoid valves 33 and 34, which can be preprogrammed or voluntarily controlled to increase or decrease the regulating pressure in chamber 31. Valve 34 and exhaust tube 35 permit venting of gas from chamber 31 when a reduction in extrusion rate is desired.

Transversely slidable plate 15 is provided with rectangular slot orifices 16 which are similar in size, shape, and spacing to orifices 8 in extruder plate 9 so that in a given position of plate 15, orifices 16 and 8 are in registry and both open to their fullest extent as shown. The slidable plate orifices are each provided with a shearing edge 14. Transverse slidable motion of the plate is produced by motor 17 which can be remote-controlled. Undesirable lateral motion of plate 15 is checked by pin and slot guide 20 and 20a. The propellant extruded into the combustion chamber is not burning, as shown, but ignition can be accomplished by resistance wire igniter 18 of which there may be more than one. The high pressure gases generated after burning is initiated vent through rocket nozzle 19 at high velocity to produce thrust.

Slidable plate 15 can be used to reduce mass flow of the propellant by being moved into a position across extrusion orifices 8, as shown in FIGURES 2 and 3 wherein it reduces their effective size, or it can be employed as a cut-off device completely to stop flow by covering the entire extrusion orifice, as shown in FIGURE 4.

Figure 5:
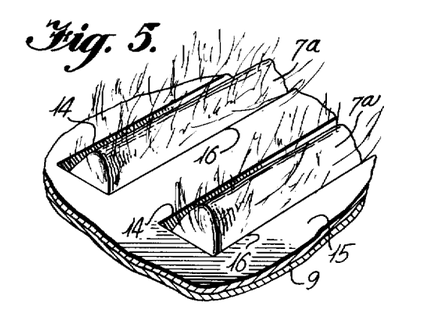
FIGURES 5 and 6 are fragmentary perspective views of the equilibrium burning surface of a strip of extruding monopropellant at different rates of extrusion.

FIGURES 5 and 6 show the downstream sloping or substantially V-shape configuration of the burning surface or leading face 7a of the extruding strip of monopropellant of FIGURE 1 in the combustion chamber when equilibrium or steady-state burning has been reached at different rates of extrusion. The rate of extrusion in FIGURE 6 is higher than in FIGURE 5 so that height of the extruded portion of the strip is greater, the sides of the V-shaped face slope more steeply, and burning surface area 7b is greater.

Figure 7:
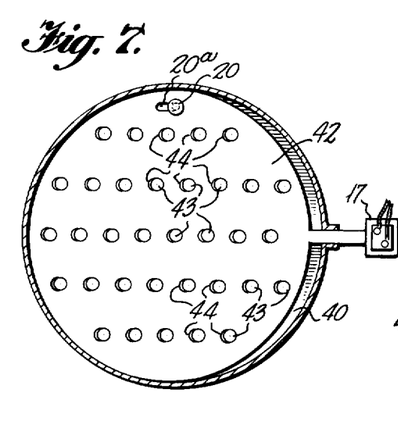
FIGURE 7 is a cross-sectional view similar to FIGURE 2 showing a modified extruding plate and mass flow control and cut-off device adapted for use in a cylindrical chamber in open position.

FIGURES 7 and 8 show a modification in which extrusion plate 40 is provided with circular extrusion orifices 41 and transversely slidable mass flow control and cut-off plate 42 is provided with similarly spaced orifices 43 having a shear edge 44, which in FIGURE 7 are shown in completely open registry with extrusion orifices 41 in the extrusion plate 40. In FIGURE 8, the cut-off plate has been moved so that extrusion orifices 41 are completely covered and flow of propellant is stopped.

FIGURES 9 and 10 show the cone-shaped equilibrium burning surfaces 45 and 45a formed by the leading face of propellant extruding through a circular orifice, such as shown in FIGURE 7, at different rates of extrusion, that of FIGURE 10 being higher and, therefore, providing greater burning surface area.

FIGURE 11 is substantially similar to the device of FIGURE 1 with the following modifications. Extrusion plate 51 is provided with slot orifices 52, each of which has a longitudinal flow-divider 53 in the form of a wire. The wire flow-divider in effect divides the larger orifices 52 into narrower orifices. Cut-off plate 54 provided with orifices 55, shown in registry with orifices 52 in FIGURES 11, 12, 14 and 15 and having shear edge 56, is positioned beneath the extrusion plate and can be shifted laterally by motor 17 to cut off flow of monopropellant through orifices 52 as shown in FIGURE 13. Guide pins 57 and slots 58 hold the cut-off plate in position against the extrusion plate and prevent undesirable sidewise motion. The flow dividers 53 are high resistance wires which can be employed as igniters by connecting them by means of properly insulated wires 59 to a source of electric current, as shown diagrammatically in FIGURES 12 and 13. Prior to ignition the monopropellant extrudes in pairs of substantially plane-surfaced narrow strips or ribbons 60 as shown in cross-section in FIGURE 11. After ignition, when equilibrium burning is reached, the burning surfaces 61 and 62 assume the downstream-convergent configurations shown in FIGURES 14 and 15. The rate of extrusion is higher in FIGURE 15, thereby resulting in an extruded strip of increased height.

Figure 17:
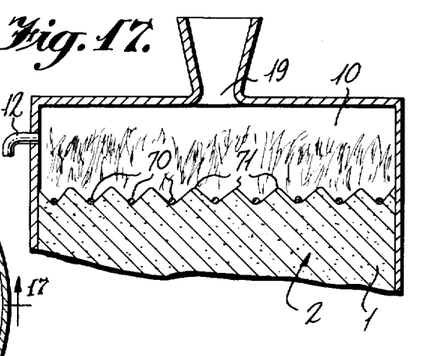
FIGURE 17 is a vertical sectional view taken along the line 17—17 of FIGURE 16.

FIGURES 16 and 17 show a modified shaping means for the monopropellant extruding from the propellant reservoir 2 which comprises a plurality of parallel wire flow dividers 70 with a cut-off plate omitted. FIGURE 17 shows, in cross section, the equilibrium burning surface 71 of the extruded strips or ribbons of monopropellant.

Figure 18:
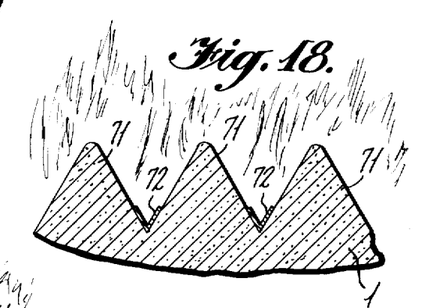
FIGURES 18 and 19 are fragmentary sectional views of two different flow-dividers.
Figure 19:
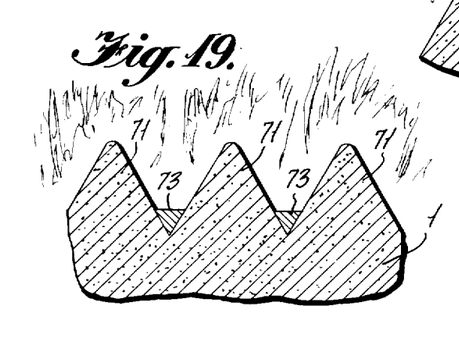

FIGURES 18 and 19 illustrate respectively flow dividers of different configuration, flow-dividers 72 being V-shaped and flow-divider 73 being triangular prismatic.

FIGURE 20 illustrates another grid-type flow-divider shaping means in which crossing narrow flow-dividers 74 and 75 form rectangular orifices 76. The extruding propellant at equilibrium burning assumes the leading face configuration substantially as shown with four substantially plane sides converging into a leading apex.

FIGURE 21 illustrates concentric flow-dividers in the form of rings 80, which, as shown, are shallow but which can be of any desired depth. The rings are held in position by vertical rods 81 attached to the side wall of the chamber by spider 82. The extruding monopropellant is shaped by the rings into concentric annular ribbons or strips 83 and a central column 84. At burning equilibrium the leading face of the extruding propellant assumes the sloping configuration as shown in FIGURES 21 and 22, strips 83 having an annular leading edge 85 and the central column having leading apex 86.

FIGURES 23a and 23b illustrate the shaping and recessing effect of a spherical mandrel 87 positioned at the mouth of extrusion orifice 88 in extrusion plate 89. The mandrel is anchored by means of rod 90 and spider 91. The mandrel shapes a recess 92 in the leading face 93 of the extruding propellant which is a cylindrical bore as shown in FIGURE 23a prior to ignition and provides additional exposed surface. At equilibrium burning the burning surface slopes downstream as shown in FIGURE 23b to form an annular conical face 94 having a central conical recess 95.

FIGURE 24 illustrates diagrammatically some differently shaped mandrels which can be used as flow dividers.

FIGURES 25 and 26 illustrate the use of a plurality of spherical mandrels 100 to shape the leading face of a single mass of extruding propellant with the walls of the combustion chamber 101 forming in effect a large extrusion tube. The propellant is extruded from storage chamber 102. At equilibrium burning as shown, the surface exposed by the mandrels as the propellant is extruded past them burns into the shape of recessed cones 103 which flare downstream and intersect with each other to form curved ridges 104 and apical points 105. The mandrels are anchored in position by rods 106 and spider 107.

Figure 27:
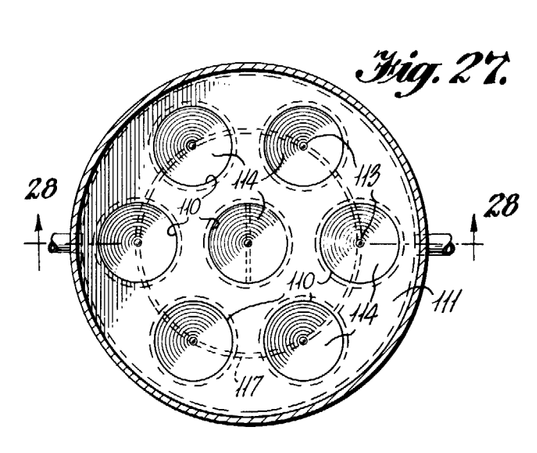
FIGURE 27 is a plan view of still another modified flow-divider shaping means.

FIGURES 27 and 28 show a plurality of extrusion tubes 110 in hollow plate or partition 111 which provides a chamber for circulation of coolant around the extrusion tubes as shown. The propellant 1 is extruded from storage chamber 112 into extrusion tubes 110 where it flows past spherical mandrels 113 positioned within the tubes at a point substantially below their downstream ends. The leading face of the propellant mass extruding within each tube is recessed by the mandrel 113. Burning takes place within the tube and at equilibrium the burning surface assumes the shape of an inverted cone 114, as shown, with the outer periphery of the mass supported by the walls of the extrusion tube. The portion of each tube downstream of the burning surface forms part of the combustion chamber 115. The mandrels are held in position by rods 116 and spider 117.

In some special applications, as, for example, where the monopropellant is a heterogeneous system comprising a dispersion of solid oxidizer in a substantially inert liquid fuel so that an inhibiting layer of the liquid fuel may form on the periphery of the advancing column or strip of monopropellant as a result of shearing stresses at the wall during extrusion and where the combustion chamber is so designed as to minimize hot combustion gas circulation or is swept by relatively cool gases, such as steam, the burning surface may not extend upstream along the sides and will maintain substantially the transverse plane configuration of the unignited propellant shown in FIGURE 1. In such case controlled feeding and burning surface area can be achieved by varying the size, shape and number of the extruding orifices.

As aforementioned, the monopropellant should possess certain requisite physical characteristics. It should be sufficiently cohesive to retain its shape for an appreciable length of time when extruded. Preferably also, its cohesive strength should be sufficiently high to withstand fragmentation under the given conditions in the combustion chamber. This is of importance not only for control of the desired burning surface area, but to avoid loss or wastage of unburned propellant in some applications, as for example, rocket motors, by venting of the material out of the nozzle under such conditions as high acceleration. This is frequently a problem in the case of the burning of atomized mobile liquid propellants, some unburned particles of which fly out of the rocket nozzle. The degree of cohesive strength desirable is determined to some extent by the particular stresses developed in a particular use and the particular burning conditions as, for example, the unsupported length of the extruding, burning mass. Cohesive strength is closely related to the tensile strength of the material. In general, for the desired shape-retentivity, the monopropellant material should preferably have a minimum tensile strength of about 0.01 lb./sq. in., preferably about 0.03 p.s.i. or higher.

The cohesiveness or substantial tensile strength of the monopropellant maintains stability and uniform dispersion of its components as, for example, in the case of two-phase systems containing dispersed insoluble, solid oxidizer. This is of considerable importance, since it ensures uniformity of burning rate at the constantly generating burning surface as the end-burning material advances, thereby assuring a constant or controllable rate of gas generation.

The monopropellant, furthermore, should be extrudable at ambient temperatures, namely, should be capable of continuous flow, preferably under relatively moderate pressure differentials. Materials which are extrudable only at elevated temperatures or which require excessively high pressures to initiate and maintain flow present problems which make them generally unsuitable. In general, it is desirable to employ a material which flows at a maximum shear stress of about 1 p.s.i. at the wall of the tube or orifice through which it is being extruded. In some applications, the shear stress point can be higher, as, for example, up to about 10 p.s.i. or more, where stronger pressurizing means for extrusion are feasible.

The controllable feeding of a monopropellant having both shape-retentiveness and fluidity under stress substantially eliminates still another difficulty encountered with solid propellants housed in the combustion chamber, namely, the dangers of fracturing or cracking of the solid propellant which can so enormously increase burning surface area and the amount of gases produced as to cause explosion of the combustion chamber. The brittleness and fissuring characteristic of many solid propellants at low ambient temperatures is no problem with monopropellants having the physical characteristics requisite for our purpose since they can either be formulated so as to have exceedingly low freezing points or, upon warming to ambient temperatures of use, regain their flow characteristics and form a continuous, unbroken mass during pressure extrusion.

Substantially, any monopropellant composition having the requisite physical characteristics, as for example, gelled liquid monopropellants such as hydrazine nitrate, nithromethane, or ethylene oxide containing a suitable gelling agent can be employed. One of the important advantages of the invention, however, stems from the fact that the process makes possible the utilization of propellant compositions possessing the highly desirable characteristics of solid propellants in terms, for example, of the high density and high impulse required for high performance levels and reduced storage volume requirements with the important concomitant advantages of propellant feed control and, thereby, control of gas generation under varying circumstances.

Double-base propellant compositions comprising nitrocellulose gelatinized with nitroglycerin with or without, but preferably with, an inert, non-volatile plasticizer such as triacetin, diethyl phthalate, dibutyl phthalate or dibutyl sebacate, to reduce impact sensitivity, in proportions producing a soft gel having the requisite shape retentiveness and flow characteristics are suitable for use. Such relatively high-density, high-impulse propellants have hitherto been utilizable only as solid propellants with the predesigning, presizing and other disadvantages entailed by this mode of use.

In general, gel compositions comprising about 3 to 25% nitrocellulose dissolved in nitroglycerin, desirably diluted with at least about 10%, preferably at least 20 to 30% by weight based on total liquid, of an inert plasticizer solvent to reduce sensitivity, possess the requisite physical properties. Such soft gel compositions also have the advantage of being admixable with finely divided insoluble solid oxidizer such as the ammonium, sodium, and potassium perchlorates and nitrates, to provide for combustion of the inert plasticizer, while retaining the desired shape-retentive, extrudable characteristics. Other highly active propellant liquids, such as pentaerythritol trinitrate, 1,2,4-butanetriol trinitrate, and diethylene-glycol dinitrate, which normally are too sensitive for use as mobile liquid monopropellants, can also be gelatinized with nitrocellulose, with or without inert plasticizer diluent and with or without finely divided solid, insoluble oxidizer, to provide monopropellants of substantially higher density than presently usable mobile liquid monopropellants.

Still another advantage of the process lies in the fact that it makes possible combustion with controllable feeding and gas generation rates of heterogeneous monopropellants which are characterized not only by high density and high impulse, but also by the high autoignition temperature, low shock- and impact-sensitivity, non-corrosiveness and nontoxicity of many of the presently used solid composite-type propellants, which make them safe to handle, to transport and to store for extended periods of time under substantially any environmental temperature conditions likely to be encountered. By heterogeneous is meant a two-phase system wherein a finely divided, solid oxidizer is dispersed in an organic liquid fuel in which the oxidizer is insoluble. Spraying or atomization into a combustion chamber of dispersions of a solid oxidizer in a liquid fuel, even where the solid is present in sufficiently small amounts so that the slurry is free-flowing, is not feasible. The solid tends to clog the small atomization orifices. Comminution of the composition into a finely divided spray in the combustion chamber also poses reaction problems because of the difficulty in maintaining the solid oxidizer phase and the liquid fuel phase in properly proportioned contact for complete oxidation.

Heterogeneous monopropellant compositions which are particularly advantageous comprise stable dispersions of finely divided, insoluble solid oxidizer in a continuous matrix of a nonvolatile, substantially shock-insensitive liquid fuel, the composition having sufficiently high cohesive strength to form a plastic mass which maintains the solid oxidizer in stable, uniform dispersion and which, while capable of continuous flow at ambient temperatures under stress, nevertheless retains a formed shape for an appreciable length of time. The compositions, which preferably are soft gels, possess the characteristics of non-Newtonian liquids, namely yield to flow only under a finite stress.

The liquid fuel can be any oxidizable liquid which is preferably high boiling and substantially nonvolatile, which is preferably free-flowing or mobile at ordinary temperatures, desirably having a maximum solidification or pour-point of about −2° C. or less, and which is substantially inert or insensitive to shock or impact. The latter characteristic can be achieved by employing an oxidizable liquid, at least about 50% by weight of which is an enert compound requiring an external oxidizer for combustion. For special applications, an active liquid fuel containing combined oxygen available for combustion or other components of the molecule, such as nitroglycerin, diethylene glycol dinitrate, pentaerythritol trinitrate or 1,2,4-butanetriol trinitrate, can be admixed with the inert fuel component, such dilution serving substantially to nullify the sensitivity of the active component.

The inert liquid fuel is preferably an organic liquid which, in addition to carbon and hydrogen, can contain other elements such as oxygen, nitrogen, sulfur, phosphorus or silicon and which meets the aforedescribed requirements in terms of physical and chemical properties. Such liquid fuels burn to produce gaseous combustion products and include hydrocarbons, e.g., triethyl benzene, dodecane and the like; compounds containing some oxygen linked to a carbon atom, such as esters, e.g., methyl maleate, diethyl phthalate, butyl oxalate, dibutyl sebacate, dioctyl adipate, etc.; alcohols, e.g., benzyl alcohol, diethylene glycol, triethylene glycol, etc.; others, e.g., methyl o-naphthyl ether; ketones, e.g., benzyl methyl ketone, phenyl o-tolyl ketone, isophorone; acids, e.g., 2-ethylhexoic acid, caproic acid, n-heptylic acid, etc.; aldehydes, e.g., cinnemaldehyde; nitrogen-containing organic compounds such as amines, e.g., N-ethylphenylamine, tri-n-butylamine, diethyl aniline; nitriles, e.g., caprinitrile; phosphorus-containing compounds, e.g., triethyl phosphate; sulfur-containing compounds, e.g., diethyl sulfate; pentamethyl disiloxanemethyl methacrylate, and many others.

The solid oxidizer can be any suitable, active oxidizing agent which yields oxygen readily for combustion of the fuel and which is insoluble in the liquid fuel vehicle. Suitable oxidizers include the inorganic oxidizing salts, such as ammonium, sodium, potassium and lithium perchlorate or nitrate, and metal peroxides such as barium peroxide. The solid oxidizer should be finely divided, preferably with a maximum particle size of about 300 to 600 microns, to ensure stable, uniform dispersion of the oxidizer in the liquid fuel so that it will not separate or sediment despite lengthy storage periods, although some somewhat larger particles can be maintained in gelled compositions without separation.

The amount of liquid fuel vehicle in the composition is critical only insofar as an adequate amount must be present to provide a continuous matrix in which the solid phase is dispersed. This will vary to some extent with the particular solids dispersed, their shape and degree of subdivision and can readily be determined by routine test formulation. The minimum amount of liquid required generally is about 8%, usually about 10%, by weight. Beyond the requisite minimum any desired proportion of liquid fuel to dispersed solid can be employed, depending on the desired combustion properties, since the desired cohesive, shape-retentive properties can be obtained by additives such as gelling agents. Where the requisite cohesiveness and plasticity are obtained by proper size distribution of the finely divided solid, without an additional gelling agent, the amount of solid incorporated should be sufficient to provide the consistency essential for shape-retentiveness. This will vary with the particular liquid vehicle, the particular solid and its size distribution and can readily be determined by routine testing.

Thixotropic, plastic, shape-retentive compositions having the desired flow characteristics can be made by incorporating sufficiently finely divided solid, insoluble oxidizer into the liquid fuel to make an extrudable mass when particles are so distributed that the minimum ratio of size of the largest to the smallest particles is about 2:1 and preferably about 10:1. At least 90% of the particles by weight should preferably have a maximum size of about 300 microns. Above this, a small proportion by weight up to about 600 microns can be tolerated.

It is generally preferable to incorporate a gelling agent in the solid oxidizer-liquid fuel dispersion. Such gels possess the desired dispersion stability, cohesiveness, shape-retentiveness and flow characteristics. Any gelling agent which forms a gel with the particular liquid fuel can be employed. Examples of compatible gelling agents include natural and synthetic polymers such as polyvinyl chloride; polyvinyl acetate; cellulose esters, e.g., cellulose acetate and cellulose acetate butynate; cellulose ethers, e.g., ethyl cellulose and carboxymethyl cellulose, metal salts of higher fatty acids such as the Na, Mg and Al stearates, palmitates and the like; salts of naphthenic acid, casein; karaya gum; gelatine; bentonite clays and amine-treated bentonite clays; etc. Organic gelling agents are preferred since they can also serve as fuels. The amount of gelling agent employed is largely determined by the particular liquid fuel, the particular gelling agent, the amount of dispersed solid, and the specific physical properties desired.

Particle size distribution of the dispersed solids is generally not an important factor in imparting cohesive, plastic properties to the composition and in minimizing separation where a gelling agent is employed since these factors are adequately provided for by the gel. Even some substantially large solid particles as, for example, up to about 1000 microns, can be held in stable dispersion. However, the presence of different size particles is often desirable because of the improved packing effect obtained, in terms of increased amounts of solids which can be incorporated.

Finely divided, solid metal powders, such as Al or Mg, can be incorporated in the monopropellant compositions as an additional fuel component along with the liquid fuel. Such metal powders possess the advantages both of increasing density and improving specific impulse of the monopropellant because of their high heats of combustion. The metal particles should preferably be within a size range of 0.25 to 50 microns. The amount of such metal fuel added is not critical but is determined largely by the specific use and the requisite physical characteristics of the composition as aforedescribed. For example, it should not be incorporated in such large amounts that the mixture either becomes granular in texture or deficient in amount of oxidizer. In general the maximum amount of metal powder which can be introduced while maintaining the desired physical properties of the composition and an adequate amount of solid oxidizer is about 45% by weight, and depends upon the density of the metal and its chemical valence or oxidant requirement for combustion.

Stoichiometric oxidizer levels with respect to the liquid fuel or liquid plus powdered metal fuels are sometimes desirable for applications where maximum heat release is wanted. Actual stoichiometric amounts of oxidizer vary, of course, with the particular fuel components and the particular oxidizer and can readily be computed by anyone skilled in the art. In general, however, the amount required will be in substantially major proportion, as for example, about 65% and generally more, of the total composition. The requisite high concentrations of solid oxidizer for stoichiometry can generally be readily incorporated, particularly where the liquid fuel contains some combined oxygen as aforedescribed, while maintaining its essential physical characteristics.

In some cases, as for example, where the monopropellant is being employed in a gas generator for driving a turbine, reciprocating engine, or the like, as a source of gas pressure, or to provide heat energy, the amount of oxidizer can be less than stoichiometric so long as sufficient is introduced to maintain active combustion and a desired level of gas generation. The presence of an active liquid fuel component, namely a fuel containing oxygen available for combustion, reduces, of course, the amount of solid oxidizer required both for stoichiometric and less-than-stoichiometric combustion levels.

*Example I*

74.2% ammonium perchlorate (a mixture of 1725 r.p.m. and 14,000 r.p.m. grinds in a ratio of 1:2, 4–400 microns, 98% by weight under 300 microns), 24.8% triacetin and 1% copper chromite were admixed at room temperature. The resulting composition was a cohesive, shape-retentive mass which could be made to flow continuously under moderate pressure. The composition had an autoignition temperature of 275° C. and an impact sensitivity of 80/85 cm. with a 3.2 kg. weight. Burning rate of the material at atmospheric pressure was 0.04 in./sec. The material was extruded through a stainless steel tube 0.162 in. in diameter into a nitrogen-filled chamber and the leading face burned at a rate of 0.1 in./sec. at 35 p.s.i.

*Example II*

A gel was made with 75% ammonium perchlorate (1725 and 14,000 r.p.m. grinds, 1:2), 24% dibutyl sebacate and 1% polyvinyl chloride. The polyvinyl chloride was mixed with the dibutyl sebacate and heated to 172° C. to form a gel, which was cooled and loaded with the ammonium perchlorate. The composition was a plastic, shape-retentive mass having a tensile strength of 0.31 p.s.i. Length of an extruded column before breaking under its own weight was 5 inches. Shear stress at the wall required to initiate flow in a ⅜ in. diameter tube was 0.035 p.s.i.

The dispersion was highly stable as shown by vibrator tests at 60 cycles and an acceleration of 4 g. No separation occurred after 185 hours. The material was also tested by centrifuge at an acceleration of 800 g. and showed no separation after 30 minutes.

Autoignition temperature of the composition was 286° C. and its solidification or freezing point −18° C.

The composition extruded as a shaped mass through a 12 in. tube with 0.375 in. bore at a rate of 0.25 in./sec. under a pressure of 11 p.s.i.g.

Linear burning rate of the material at 70° F. and 1000 p.s.i. was 0.46 in./sec.

Although this invention has been described with reference to illustrative embodiments thereof, it will be apparent to those skilled in the art that the principles of this invention may be embodied in other forms but within the scope of the appended claims.

We claim:

1. A process for generating gases which comprises continuously extruding a continuous mass of plastic monopropellant composition which burns to produce gaseous combustion products, said composition having sufficient cohesive strength to retain a formed shape requiring finite stress to produce flow, having a minimum tensile strength of about 0.01 p.s.i., and being capable of continuous flow at ambient temperatures under a maximum shear stress at a wall of about 10 p.s.i., into a combustion chamber at a rate at least as high as the linear burning rate of the propellant material, through plurality of a shaping orifice, burning the leading faces of the advancing shaped masses within said combustion chamber, said leading faces forming the burning surfaces of the extruding propellant and controlling the total burning surface area of the extruding propellant and, thereby, the mass rate of gas generation, by varying the cross-sectional area of the shaping orifices.

2. A process for generating gases which comprises continuously extruding a continuous shaped mass of plastic monopropellant composition which burns to produce gaseous combustion products, said composition having sufficient cohesive strength to retain a formed shape, requiring finite stress to produce flow, having a minimum tensile strength of about 0.01 p.s.i., and being capable of continuous flow at ambient temperatures under a maximum shear stress at a wall of about 10 p.s.i., into a combustion chamber at a rate at least as high as the linear burning rate of the propellant material, through an orifice which laterally shapes said mass, recessing the leading face of the advancing laterally shaped mass, thereby increasing the burning surface area of said shaped mass relative to its length in the combustion chamber at equilibrium burning thereof, and burning the leading face of the advancing shaped mass within said combustion chamber, said leading face forming the burning surface of the extruding propellant.

3. A process for generating gases which comprises continuously extruding a continuous shaped mass of plastic monopropellant composition which burns to produce gaseous combustion products, said composition having sufficient cohesive strength to retain a formed shape, requiring finite stress to produce flow, having a minimum tensile strength of about 0.01 p.s.i., and being capable of continuous flow at ambient temperatures under a maximum shear stress at a wall of about 10 p.s.i., into a combustion chamber at a rate at least as high as the linear burning rate of the propellant material, through an orifice which laterally shapes said mass recessing the leading face of the advancing laterally shaped mass, thereby increasing the burning surface area of said shaped mass relative to its length in the combustion chamber at equilibrium burning thereof, burning the leading face of the advancing shaped mass within said combustion chamber, said leading face forming the burning surface of the extruding propellant, and controlling the burning surface area of the extruding propellant and, thereby, the mass rate of gas generation, by varying the rate of extrusion of the monopropellant into the combustion chamber.

4. A process for generating gases which comprises continuously extruding a continuous shaped mass of plastic monopropellant composition which burns to produce gaseous combustion products, said composition having sufficient cohesive strength to retain a formed shape, requiring finite stress to produce flow, having a minimum tensile strength of about 0.01 p.s.i., and being capable of continuous flow at ambient temperatures under a maximum shear stress at a wall of about 10 p.s.i., into a combustion chamber at a rate at least as high as the linear burning rate of the propellant material, through an orifice which laterally shapes said mass shaping the leading face of the advancing laterally shaped mass to form a plurality of recesses, thereby increasing the burning surface area of said shaped mass relative to its length in the combustion chamber at equilibrium burning thereof, and burning the leading face of the advancing shaped mass within said combustion chamber, said leading face forming the burning surface of the extruding propellant.

5. A process for generating gases which comprises continuously extruding a continuous shaped mass of plastic monopropellant composition which burns to produce gaseous combustion products, said composition having sufficient cohesive strength to retain a formed shape, requiring finite stress to produce flow, having a minimum tensile strength of about 0.01 p.s.i., and being capable of continuous flow at ambient temperatures under a maximum shear stress at a wall of about 10 p.s.i., into a combustion chamber at a rate at least as high as the linear burning rate of the propellant material, through an orifice which laterally shapes said mass shaping the leading face of the advancing laterally shaped mass to form a plurality of recesses, thereby increasing the burning surface area of said shaped mass relative to its length in the combustion chamber at equilibrium burning thereof, burning the leading face of the advancing shaped mass within said combustion chamber, said leading face forming the burning surface of the extruding propellant, and controlling the burning surface area of the extruding propellant and, thereby, the mass rate of gas generation, by varying the rate of extrusion of the monopropellant into the combustion chamber.

6. A process for generating gases which comprises continuously extruding a continuous shaped mass of plastic monopropellant composition which burns to produce gaseous combustion products, said composition having sufficient cohesive strength to retain a formed shape, requiring finite stress to produce flow, having a minimum tensile strength of about 0.01 p.s.i., and being capable of continuous flow at ambient temperatures under a maximum shear stress at a wall of about 10 p.s.i., into a combustion chamber at a rate at least as high as the linear burning rate of the propellant material, through a plurality of shaping orifices, thereby dividing the monopropellant into a plurality of shaped masses, and burning the leading faces of the advancing shaped masses within said combustion chamber, said division into a plurality of shaped masses making possible an increase in the ratio of total burning surface area at burning equilibrium to length of any one of said plurality of masses in the combustion chamber as compared with said ratio for a single mass of equal total cross-sectional area, at a given rate of extrusion.

7. A process for generating gases which comprises continuously extruding a continuous mass of plastic monopropellant composition which burns to produce gaseous combustion products, said composition having sufficient cohesive strength to retain a formed shape, requiring finite stress to produce flow, having a minimum tensile strength of about 0.01 p.s.i., and being capable of continuous flow at ambient temperatures under a maximum shear stress at a wall of about 10 p.s.i., into a combustion chamber at a rate at least as high as the linear burning rate of the propellant material, through a plurality of shaping orifices substantially spaced from each other, thereby dividing the monopropellant into a plurality of shaped masses, and burning the leading faces of the advancing shaped masses within said combustion chamber, said division into a plurality of shaped masses making possible an increase in the ratio of total burning surface area at burning equilibrium to length of any one of said plurality of masses in the combustion chamber as compared with said ratio for a single mass of equal total cross-sectional area, at a given rate of extrusion.

8. A process for generating gases which comprises continuously extruding a continuous shaped mass of plastic monopropellant composition which burns to produce gaseous combustion products, said composition having sufficient cohesive strength to retain a formed shape, requiring finite stress to produce flow, having a minimum tensile strength of about 0.01 p.s.i., and being capable of continuous flow at ambient temperatures under a maximum shear stress at a wall of about 10 p.s.i., into a combustion chamber at a rate at least as high as the linear burning rate of the propellant material, through a plurality of shaping orifices substantially spaced from each other, thereby dividing the monopropellant into a plurality of shaped masses, burning the leading faces of the advancing shaped masses within said combustion chamber and controlling the total burning surface area and, thereby, the mass rate of gas generation, by varying the rate of extrusion of the monopropellant into the combustion chamber, said division into a plurality of shaped masses making possible an increase in the ratio of total burning surface area at burning equilibrium to length of any one of said plurality of masses in the combustion chamber as compared with said ratio for a single mass of equal total cross-sectional area, at a given rate of extrusion.

9. A process for generating gases which comprises continuously extruding a continuous shaped mass of plastic monopropellant composition which burns to produce gaseous combustion products, said composition having sufficient cohesive strength to retain a formed shape, requiring finite stress to produce flow, having a minimum tensile strength of about 0.01 p.s.i., and being capable of continuous flow at ambient temperatures under a maximum shear stress at a wall of about 10 p.s.i., into a combustion chamber at a rate at least as high as the linear burning rate of the propellant material, through a plurality of shaping orifices substantially spaced from each other; to form a plurality of advancing laterally shaped masses, recessing the leading face of each of the advancing shaped masses, thereby increasing the burning surface area of said shaped mass relative to its length in the combustion chamber at equilibrium burning thereof, and burning the leading faces of the advancing shaped masses within said combustion chamber.

10. A process for generating gases which comprises continuously extruding a continuous shaped mass of plastic monopropellant composition which burns to produce gaseous combustion products, said composition having sufficient cohesive strength to retain a formed shape, requiring finite stress to produce flow, having a minimum tensile strength of about 0.01 p.s.i., and being capable of continuous flow at ambient temperatures under a maximum shear stress at a wall of about 10 p.s.i., into a combustion chamber at a rate at least as high as the linear burning rate of the propellant material, through a plurality of shaping orifices substantially spaced from each other, to form a plurality of advancing laterally shaped masses, recessing the leading face of each of the advancing shaped masses, thereby increasing the burning surface area of said shaped mass relative to its length in the combustion chamber at equilibrium burning thereof, burning the leading faces of the advancing shaped masses within said combustion chamber, and controlling the total burning surface area, and, thereby, the mass rate of gas generation, by varying the rate of extrusion of the monopropellant into the combustion chamber.

11. A process for generating gases which comprises continuously extruding a continuous mass of plastic monopropellant composition which burns to produce gaseous combustion products, said composition having sufficient cohesive strength to retain a formed shape, requiring finite stress to produce flow, having a minimum tensile strength of about 0.01 p.s.i., and being capable of continuous flow at ambient temperatures under a maximum shear stress at a wall of about 10 p.s.i., said composition consisting essentially of a stable dispersion of finely-divided, insoluble solid inorganic oxidizer in a continuous matrix of a substantially non-volatile oxidizable organic liquid fuel all components of which are high-boiling, contain molecularly-combined carbon and hydrogen, and burn to produce combustion gases, the solid oxidizer being present in amount sufficient to maintain active combustion of said liquid fuel, into a combustion chamber at a rate at least as high as the linear burning rate of the propellant material, through a plurality of shaping orifices, thereby dividing the monopropellant into a plurality of shaped masses, and burning the leading faces of the advancing shaped masses within said combustion chamber, said division into a plurality of shaped masses making possible an increase in the ratio of total burning surface area at burning equilibrium to length of any one of said plurality of masses in the combustion chamber as compared with said ratio for a single mass of equal total cross-sectional area, at a given rate of extrusion.

12. A process for generating gases which comprises continuously extruding a continuous mass of plastic monopropellant composition which burns to produce gaseous combustion products, said composition having sufficient cohesive strength to retain a formed shape, requiring finite stress to produce flow, having a minimum tensile strength of about 0.01 p.s.i., and being capable of continuous flow at ambient temperatures under a maximum shear stress at a wall of about 10 p.s.i., said composition consisting essentially of a stable dispersion of finely-divided, insoluble solid inorganic oxidizer in a continuous matrix of a substantially non-volatile oxidizable organic liquid fuel all components of which are high-boiling, contain molecularly-combined carbon and hydrogen, and burn to produce combustion gases, the solid oxidizer being present in amount sufficient to maintain active combustion of said liquid fuel, into a combustion chamber at a rate at least as high as the linear burning rate of the propellant material, through a plurality of shaping orifices substantially spaced from each other, thereby dividing the monopropellant into a plurality of shaped masses, and burning the leading faces of the advancing shaped masses within said combustion chamber, said division into a plurality of shaped masses making possible an increase in the ratio of total burning surface area at burning equilibrium to length of any one of said plurality of masses in the combustion chamber as compared with said ratio for a single mass of equal total cross-sectional area, at a given rate of extrusion.

13. A process for generating gases which comprises continuously extruding a continuous mass of plastic monopropellant composition which burns to produce gaseous combustion products, said composition having sufficient cohesive strength to retain a formed shape, requiring finite stress to produce flow, having a minimum tensile strength of about 0.01 p.s.i., and being capable of continuous flow at ambient temperatures under a maximum shear stress at a wall of about 10 p.s.i., said composition consisting essentially of a stable dispersion of finely-divided, insoluble solid inorganic oxidizer in a continuous matrix of a substantially non-volatile oxidizable organic liquid fuel, all components of which are high-boiling, contain molecularly-combined carbon and hydrogen, and burn to produce combustion gases, the solid oxidizer being present in amount sufficient to maintain active combustion of said liquid fuel, into a combustion chamber at a rate at least as high as the linear burning rate of the propellant material, through a plurality of shaping orifices substantially spaced from each other, thereby dividing the monopropellant into a plurality of shaped masses, burning the leading faces of the advancing shaped masses within said combustion chamber, and controlling the total burning surface area and, thereby, the mass rate of gas generation, by varying the rate of extrusion of the monopropellant into the combustion chamber, said division into a plurality of shaped masses making possible an increase in the ratio of total burning surface area at burning equilibrium to length of any one of said plurality of masses in the combustion chamber as compared with said ratio for a single mass of equal total cross-sectional area, at a given rate of extrusion.

14. A process for generating gases which comprises continuously extruding a continuous mass of plastic monopropellant composition which burns to produce gaseous combustion products, said composition having sufficient cohesive strength to retain a formed shape, requiring finite stress to produce flow, having a minimum tensile strength of about 0.01 p.s.i., and being capable of continuous flow at ambient temperatures under a maximum shear stress at a wall of about 10 p.s.i., said composition consisting essentially of a stable dispersion of finely-divided, insoluble, solid inorganic oxidizer in a continuous matrix of an oxidizable substantially non-volatile, organic liquid fuel, all components of which are high-boiling, contain molecularly combined carbon and hydrogen and burn to produce combustion gases, the solid oxidizer being present in amount sufficient to maintain active combustion of said liquid fuel, into a combustion chamber at a rate at least as high as the linear burning rate of the propellant material, and burning the leading face of the advancing shaped mass within said combustion chamber, said leading face forming the burning surface of the extruding propellant.

15. The process of claim 14 in which said liquid fuel comprises at least about 50% by weight of an inert organic liquid compound which requires an external oxidizer for combustion.

16. The process of claim 14 in which said liquid fuel has incorporated therein a minor proportion of a gelling agent selected from the group consisting of natural organic polymers, synthetic organic polymers, salts of higher fatty acids, salts of naphthenic acid, and bentonite clays.

17. The process of claim 15 in which said liquid fuel has incorporated therein a minor proportion of a gelling agent selected from the group consisting of natural organic polymers, synthetic organic polymers, salts of higher fatty acids, salts of naphthenic acid, and bentonite clays.

(References on following page)

References Cited in the file of this patent

UNITED STATES PATENTS

| | | |
|---|---|---|
| 515,500 | Nobel | Feb. 27, 1894 |
| 2,476,857 | Grafinger | July 19, 1949 |
| 2,477,549 | Van Loenen | July 26, 1949 |
| 2,530,493 | Van Loenen | Nov. 21, 1950 |
| 2,570,990 | Southern | Oct. 9, 1951 |
| 2,661,595 | Kuller et al. | Dec. 8, 1953 |
| 2,729,936 | Britton | Jan. 10, 1956 |
| 2,744,380 | McMillan et al. | May 8, 1956 |
| 2,778,189 | Carmody et al. | Jan. 22, 1957 |
| 2,848,872 | Proell et al. | Aug. 26, 1958 |
| 2,902,351 | Stokes | Sept. 1, 1959 |

FOREIGN PATENTS

| | | |
|---|---|---|
| 582,621 | Great Britain | Nov. 22, 1946 |

OTHER REFERENCES

Jet Propulsion, Air Technical Service Command, (1946), page 152. (Copy in Scientific Library.)